(12) United States Patent
Gordon

(10) Patent No.: US 10,913,623 B2
(45) Date of Patent: Feb. 9, 2021

(54) TRAILER HAVING INCREASED GROUND CLEARANCE

(71) Applicant: Mac Trailer Manufacturing, Inc., Alliance, OH (US)

(72) Inventor: Allen Gordon, Canfield, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 0 days.

(21) Appl. No.: 16/936,680

(22) Filed: Jul. 23, 2020

(65) Prior Publication Data

US 2020/0354172 A1    Nov. 12, 2020

Related U.S. Application Data

(63) Continuation of application No. 15/944,392, filed on Apr. 3, 2018, now Pat. No. 10,815,081.

(51) Int. Cl.
| | |
|---|---|
| *B65G 67/24* | (2006.01) |
| *B60P 3/22* | (2006.01) |
| *B65G 69/06* | (2006.01) |
| *B60P 1/56* | (2006.01) |

(52) U.S. Cl.
CPC ............... *B65G 67/24* (2013.01); *B60P 1/56* (2013.01); *B60P 3/225* (2013.01); *B60P 3/2245* (2013.01); *B65G 69/06* (2013.01)

(58) Field of Classification Search
CPC . B65G 67/24; B65G 69/06; B60P 1/56; B60P 1/60; B60P 3/2245; B60P 3/225
USPC ............ 406/39, 40, 41, 42, 43, 44; 414/507; 220/564; 280/837, 838, 839
See application file for complete search history.

(56) References Cited

U.S. PATENT DOCUMENTS

| | | | |
|---|---|---|---|
| 4,884,923 A | 12/1989 | Wellink | |
| 5,096,336 A * | 3/1992 | Merrett | ...................... B60P 1/16 298/17 SG |
| 5,232,246 A * | 8/1993 | Page | ........................ A62C 8/02 220/563 |
| 5,467,827 A * | 11/1995 | McLoughlin | .......... A62C 27/00 137/355.17 |
| 5,749,683 A | 5/1998 | Kunse | |
| 6,508,378 B1 | 1/2003 | Maeda et al. | |
| 7,645,114 B2 | 1/2010 | Cannon et al. | |
| 7,815,222 B2 | 10/2010 | Markham | |
| 7,832,434 B2 | 11/2010 | Carlins et al. | |
| 8,328,290 B2 | 12/2012 | Malatesta et al. | |

(Continued)

*Primary Examiner* — Joseph A Dillon, Jr.
(74) *Attorney, Agent, or Firm* — Sand, Sebolt & Wernow Co., LPA

(57) ABSTRACT

A bulk tank trailer including an interior storage compartment, at least one straight rear wheel axle supporting a plurality of ground-engaging wheels and a longitudinally aligned discharge pipe in operative communication with the interior storage compartment is disclosed. The entire discharge pipe may be positioned above a transverse plane of the at least one straight rear wheel axle. A method of discharging particulate materials is also disclosed. The method includes filling an interior storage compartment on a bulk tank trailer with the particulate materials, positioning a straight discharge pipe above a straight rear wheel axle on the bulk tank trailer, moving the particulate materials from the interior storage compartment along the straight discharge pipe and discharging the particulate materials from the discharge pipe.

13 Claims, 8 Drawing Sheets

(56) References Cited

U.S. PATENT DOCUMENTS

| | | | |
|---|---|---|---|
| 8,622,660 B1* | 1/2014 | Gore | A01K 5/0208 |
| | | | 406/41 |
| 10,155,466 B2 | 12/2018 | Kibler | |
| 2013/0328298 A1 | 12/2013 | Thomas et al. | |
| 2014/0017018 A1 | 1/2014 | Blais et al. | |
| 2014/0251471 A1 | 9/2014 | Doroh et al. | |
| 2017/0253168 A1 | 9/2017 | Cannon | |
| 2018/0104622 A1 | 4/2018 | Dawson et al. | |
| 2018/0335025 A1* | 11/2018 | Wilson | F04B 17/05 |

\* cited by examiner

TRAILER HAVING INCREASED GROUND CLEARANCE

CROSS REFERENCE TO RELATED APPLICATIONS

This application is a continuation of U.S. application Ser. No. 15/944,392, filed on Apr. 3, 2018, the disclosure of which is incorporated herein by reference.

BACKGROUND

Technical Field

The present invention is related generally to bulk tank trailers. More particularly, the present invention is related to systems and methods of discharging materials associated with bulk tank trailers. Specifically, the present invention is related to bulk tank trailers having a longitudinally extending straight discharge pipe.

Background Information

Bulk tankers and bulk tank trailers or pneumatic tank trailers are amongst the many types of vehicles used for hauling materials over highways and the like. These tankers or tank trailers are used to transport bulk materials, particularly dry, particulate-type bulk materials from one location to another. The types of material transported in these vehicles may include foodstuffs such as sugar and flour, chemicals, silica, plastic pellets, and building materials such as sand or dry cement. The term "trailer" will be used throughout the rest of the specification to identify a bulk tank trailer that is used to transport materials. However, it should be understood that the terms "trailer", "bulk tank trailer", "tanker", "tank", "truck", "vessel" or "vehicle" may be used interchangeably in this description.

Bulk tank trailers typically have several hoppers or cones which facilitate the discharge of the bulk material from within the tank into a discharge pipe through which air is pumped to discharge the material to a rear end of the trailer. Valve assemblies are located at the bottom of the hoppers whereby the hoppers may be opened or closed to respectively allow the flow of the bulk particulate material from the hoppers into the discharge pipe or to cut off this flow.

Generally, there are two forms of the discharge pipe. One form of discharge pipe is a discharge pipe that is bent to pass over a straight rear axle. However, the bent portion of the discharge pipe often wears out. As the materials are being discharged, the materials contact the bent portion of the discharge pipe which frictionally abrades the bent portion of discharge pipe.

Another form of discharge pipe is a straight discharge pipe that exits under a "humped" or bent rear axle. The bend in the rear axle forms a hole which the discharge pipe passes through. This allows the discharge pipe to be straight which reduces the amount of wear of the discharge pipe; however, the discharge pipe is low to the ground and the humped or bent axle is heavy and expensive.

SUMMARY

Therefore, there exists a need for a better way to discharge materials from bulk tanker trailers. The present disclosure addresses these and other issues.

In one aspect, the present disclosure may provide a bulk tank trailer comprising a tank assembly including a first end and a second end defining a longitudinal direction therebetween and an outer surface and an inner surface defining an interior storage compartment. The bulk tank trailer may further include at least one straight rear wheel axle supporting a plurality of ground-engaging wheels and a longitudinally aligned discharge pipe in operative communication with the interior storage compartment. The entire discharge pipe is positioned above a transverse plane of the at least one straight rear wheel axle. In one example, the discharge pipe may be straight.

The bulk tank trailer may further include a vertical longitudinally extending central plane. The discharge pipe may be longitudinally aligned along the vertical longitudinally extending central plane. The bulk tank trailer may further include a rear frame of the tank assembly operatively connected to the discharge pipe. The rear frame may carry the tank assembly at a first height allowing the discharge pipe to be positioned entirely above the transverse plane. The bulk tank trailer may further include at least one frame member defining an opening. The discharge pipe may pass through the opening.

The bulk tank trailer may further include a left rear rail, a right rear rail, at least one intermediate support member and at least one rear support plate. The left rear rail, the right rear rail, the at least one intermediate support member and the at least one rear support plate may carry the tank assembly at the first height.

The bulk tank trailer may further include a top edge of the discharge pipe extending substantially along a length of the discharge pipe, a bottom edge of the left rear rail extending substantially along a length of the left rear rail, a top edge of the at least one straight rear wheel axle extending substantially along a length of the at least one straight rear wheel axle, a horizontal longitudinally extending central plane of the tank assembly, a substantially constant first vertical distance between the top edge of the discharge pipe and the bottom edge of the left rear rail, a substantially constant second vertical distance between the top edge of the discharge pipe and the horizontal longitudinally extending central plane, a substantially constant third vertical distance between the top edge of the at least one straight rear wheel axle and the bottom edge of the left rear rail and a substantially constant fourth vertical distance between the top edge of the of the at least one straight rear wheel axle and the horizontal longitudinally extending central plane.

The bulk tank trailer may further include a bottom edge of the at least one rear support plate. The discharge pipe may be positioned approximately midway between the bottom edge of the at least one rear support plate and the top edge of the at least one straight rear wheel axle.

The bulk tank trailer may further include an air piping system operatively connected to the interior storage compartment and the discharge pipe. The entire air piping system may be positioned above the top edge of the at least one straight rear wheel axle and the transverse plane.

The bulk tank trailer may further include a valve assembly operatively connected with the interior storage compartment and the discharge pipe. The entire valve assembly may be positioned above the top edge of the at least one straight rear wheel axle and the transverse plane.

The bulk tank trailer may further include a strengthening assembly including a horizontally oriented bar positioned on the tank assembly. The horizontally oriented bar may include a bottom edge extending substantially along a length of the horizontally oriented bar. The bulk tank trailer may further include a substantially constant fifth vertical distance between the top edge of the discharge pipe and the bottom edge of the horizontally oriented bar and a substantially constant sixth vertical distance between the top edge of the at least one straight rear wheel axle and the bottom edge of the horizontally oriented bar.

The bulk tank trailer may further include a strengthening assembly including at least one vertically oriented rib positioned on the tank assembly. The at least one rib may include a bottom edge extending substantially along a width of the at least one vertically oriented rib. The bulk tank trailer may further include a substantially constant fifth vertical distance between the top edge of the discharge pipe and the bottom edge of the vertically oriented rib and a substantially constant sixth vertical distance between the top edge of the at least one straight rear wheel axle and the bottom edge of the vertically oriented rib.

The tank assembly may further include at least one hopper. The at least one hopper may include a bottom end. An interior of the at least one hopper may form a part of the storage compartment. The bottom end of the hopper may be positioned entirely above the top edge of the discharge pipe and the top edge of the at least one straight rear wheel axle. The at least one hopper may include a first hopper and a second hopper. The first hopper may include a first bottom end and the second hopper may include a second bottom end. A first interior of the first hopper and a second interior of the second hopper may form a part of the storage compartment. The first bottom and the second bottom end may be positioned entirely above the top edge of the discharge pipe and the top edge of the at least one straight rear wheel axle.

The at least one straight rear wheel axle may include a first straight rear wheel axle and a second straight rear wheel axle. The entire discharge pipe may be positioned above a first transverse plane of the first straight rear wheel axle and a second transverse plane of the second straight rear wheel axle.

In another aspect, the present disclosure may provide a method of discharging particulate materials comprising filling an interior storage compartment on a bulk tank trailer with the particulate materials, positioning a discharge pipe entirely above a straight rear wheel axle on the bulk tank trailer, moving the particulate materials from the interior storage compartment along the straight discharge pipe, and discharging the particulate materials from the discharge pipe. The discharge pipe may be straight. The method may further include positioning the discharge pipe along a vertical longitudinally extending central plane of the bulk tank trailer. The tank assembly may include a rear frame having at least one frame member defining an opening and the method may further include passing the discharge pipe through the opening.

In another aspect, the present disclosure may provide a bulk tank trailer including an interior storage compartment, at least one straight rear wheel axle supporting a plurality of ground-engaging wheels and a longitudinally aligned discharge pipe in operative communication with the interior storage compartment. The entire discharge pipe may be positioned above a transverse plane of the at least one straight rear wheel axle. A method of discharging particulate materials is also disclosed. The method includes filling an interior storage compartment on a bulk tank trailer with the particulate materials, positioning a straight discharge pipe above a straight rear wheel axle on the bulk tank trailer, moving the particulate materials from the interior storage compartment along the straight discharge pipe and discharging the particulate materials from the discharge pipe.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
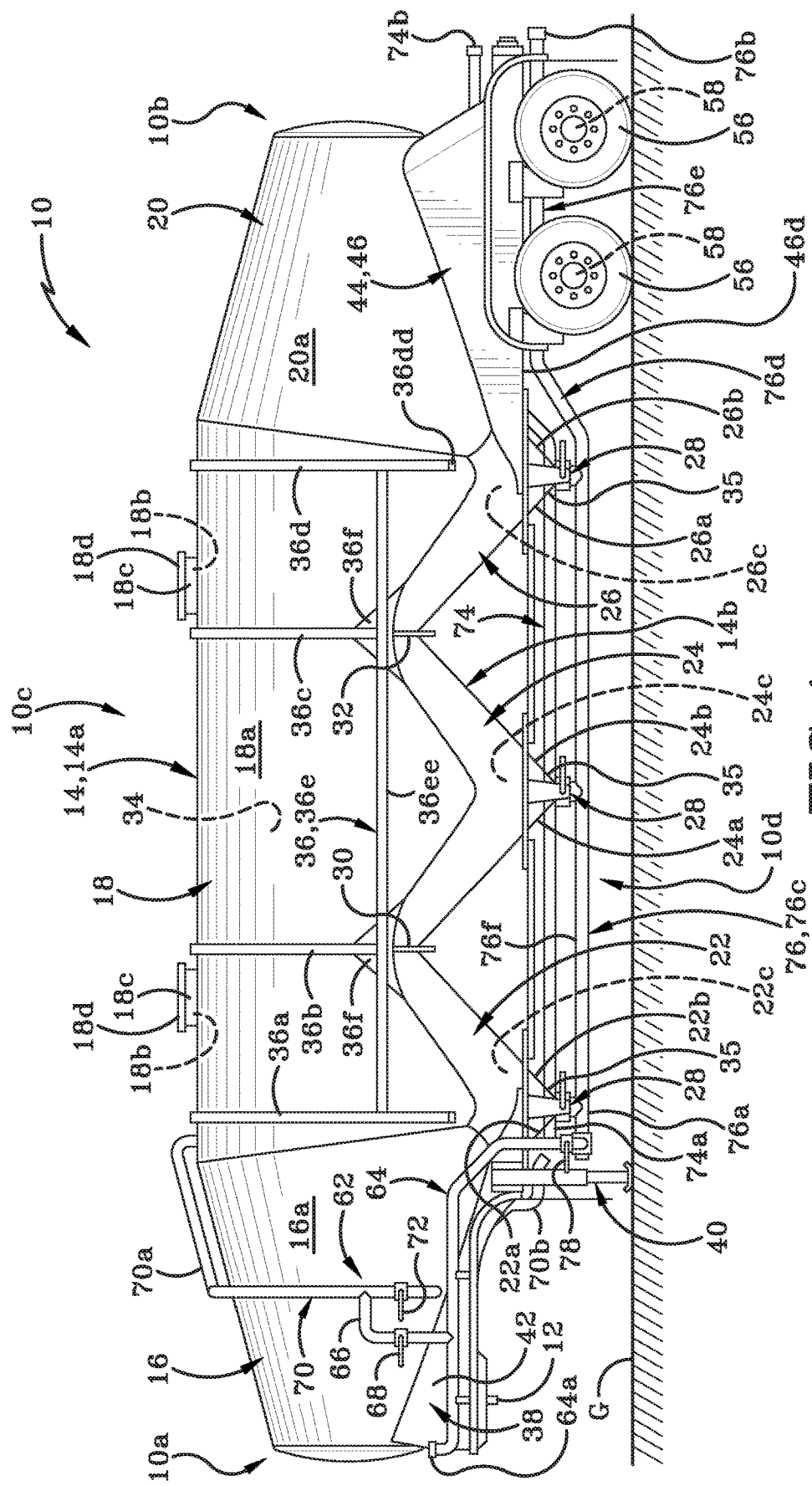
FIG. 1 is a side elevation view of a PRIOR ART dry bulk tank having a bent discharge pipe.
Figure 2:
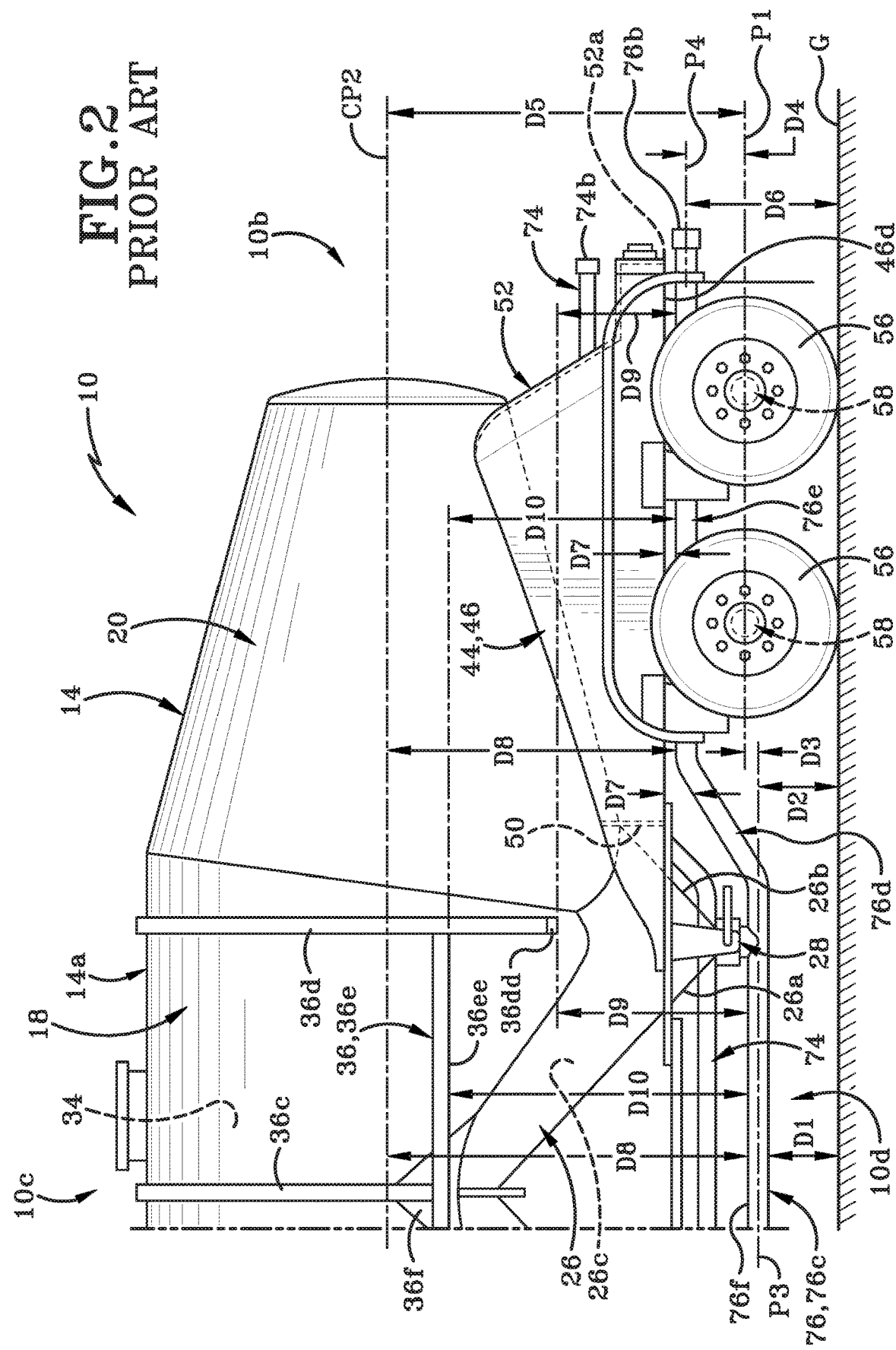
FIG. 2 is a fragmentary side elevation view of the PRIOR ART dry bulk tank of FIG. 1.
Figure 3:
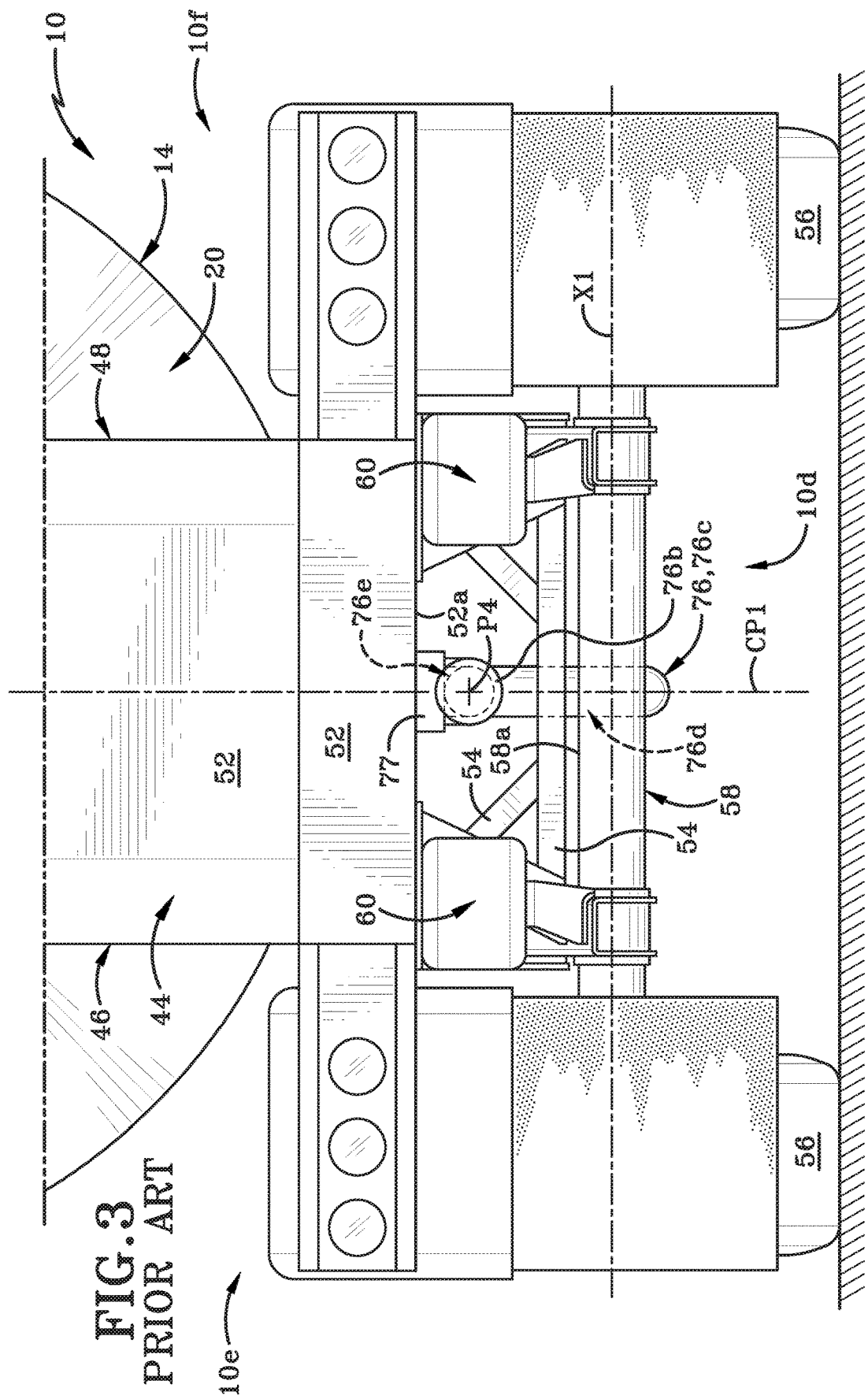
FIG. 3 is a fragmentary rear elevation view of the dry bulk tank of FIG. 1 with some components removed for clarity.
Figure 4:
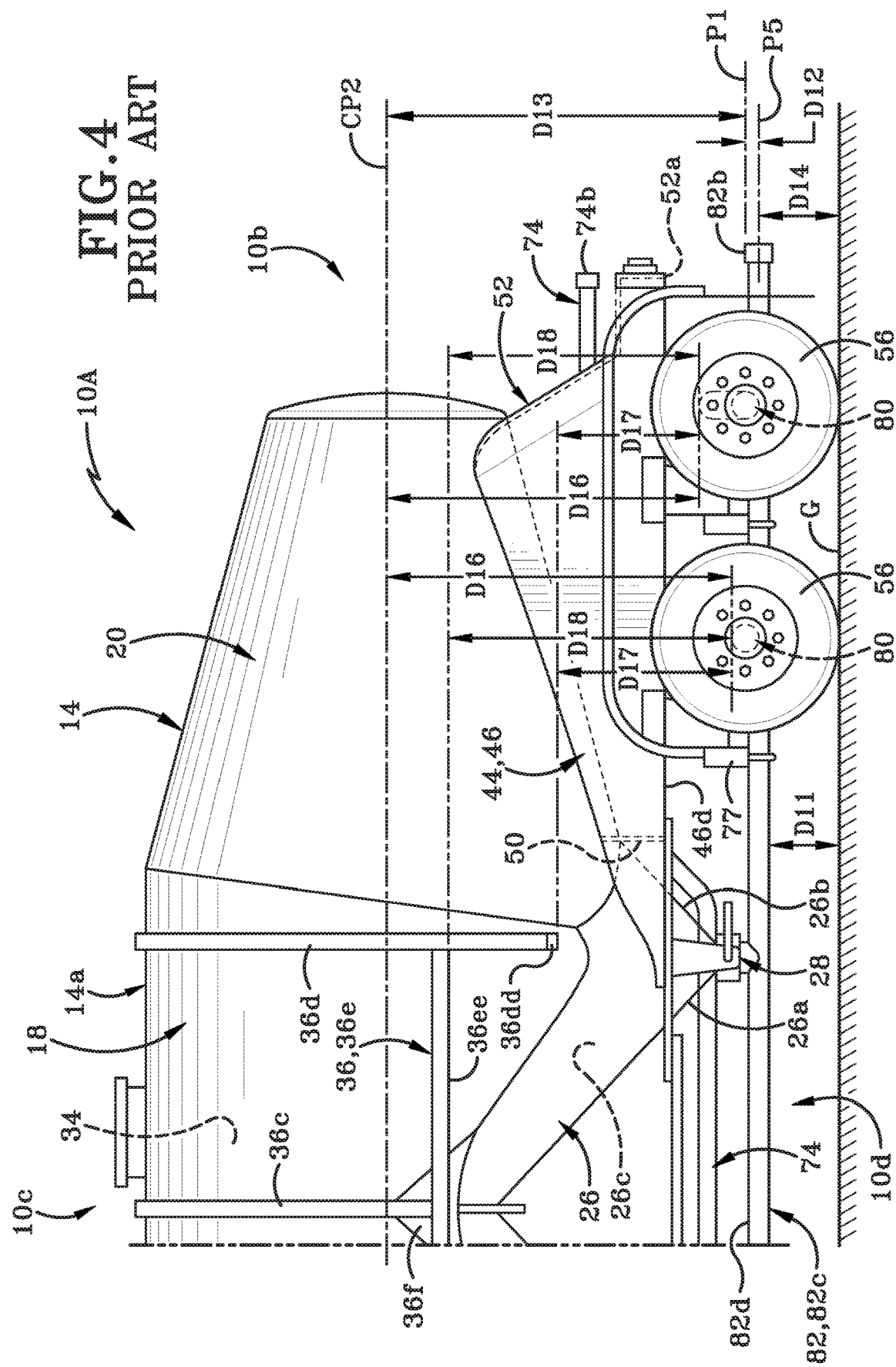
FIG. 4 is a fragmentary side elevation view of a PRIOR ART dry bulk tank having a bent axle.
Figure 5:
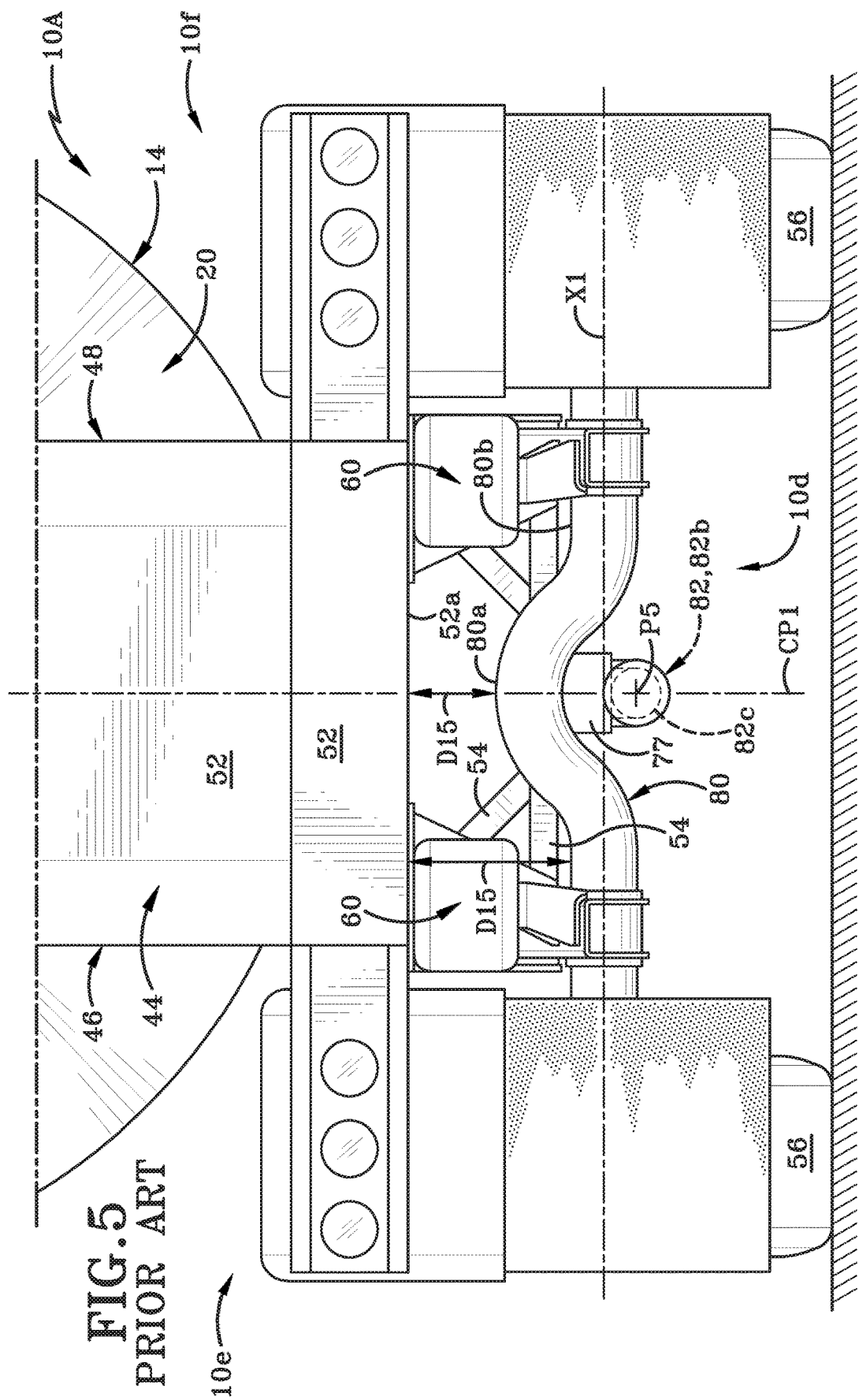
FIG. 5 is a fragmentary rear elevation view of the dry bulk tank of FIG. 4 with some components removed for clarity.
Figure 6:
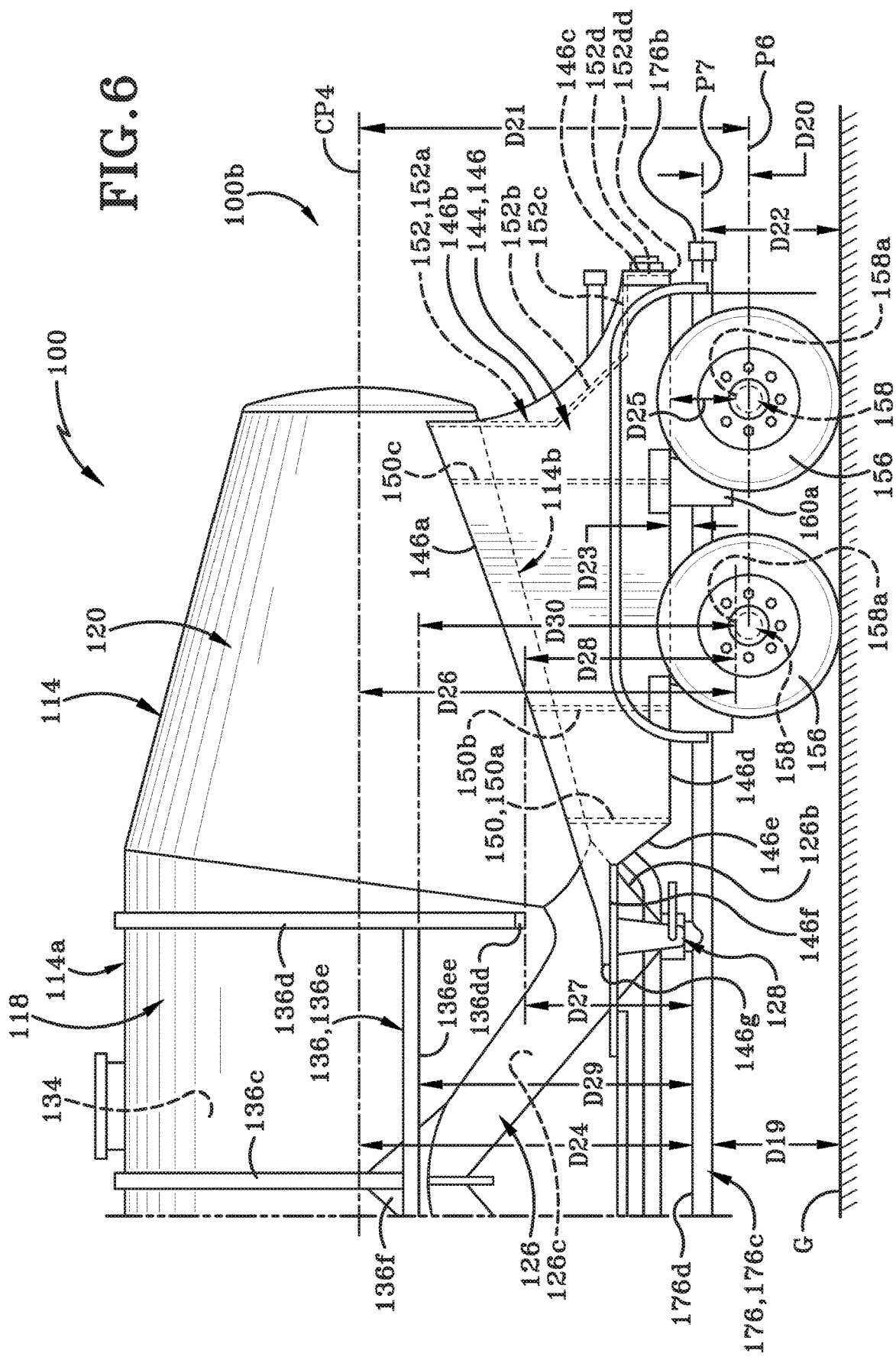
FIG. 6 is a fragmentary side elevation view of a dry bulk tank in accordance with one aspect of the present disclosure.
Figure 7:
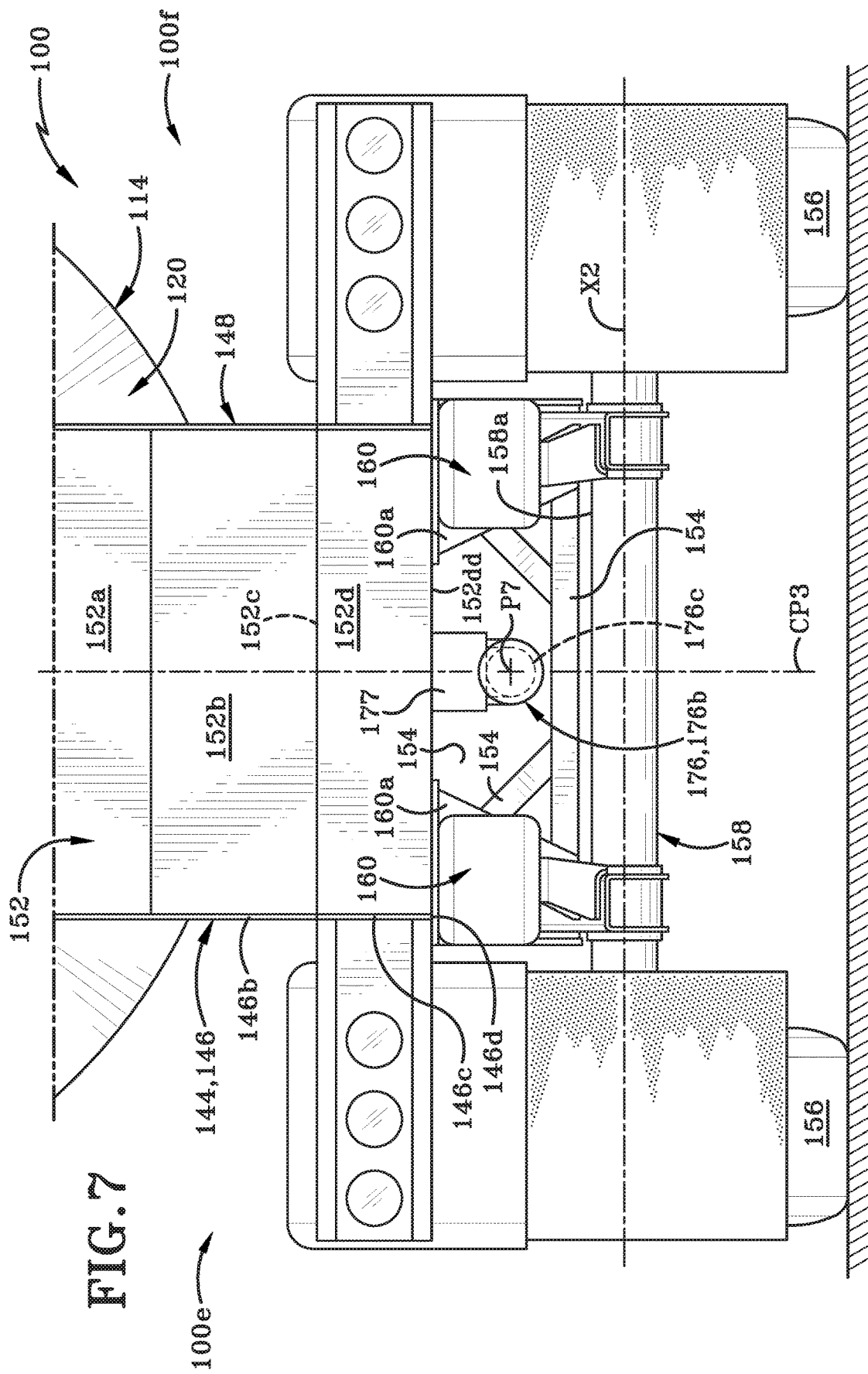
FIG. 7 is a fragmentary rear elevation view of the dry bulk tank of FIG. 6 with some components removed for clarity.
Figure 8:
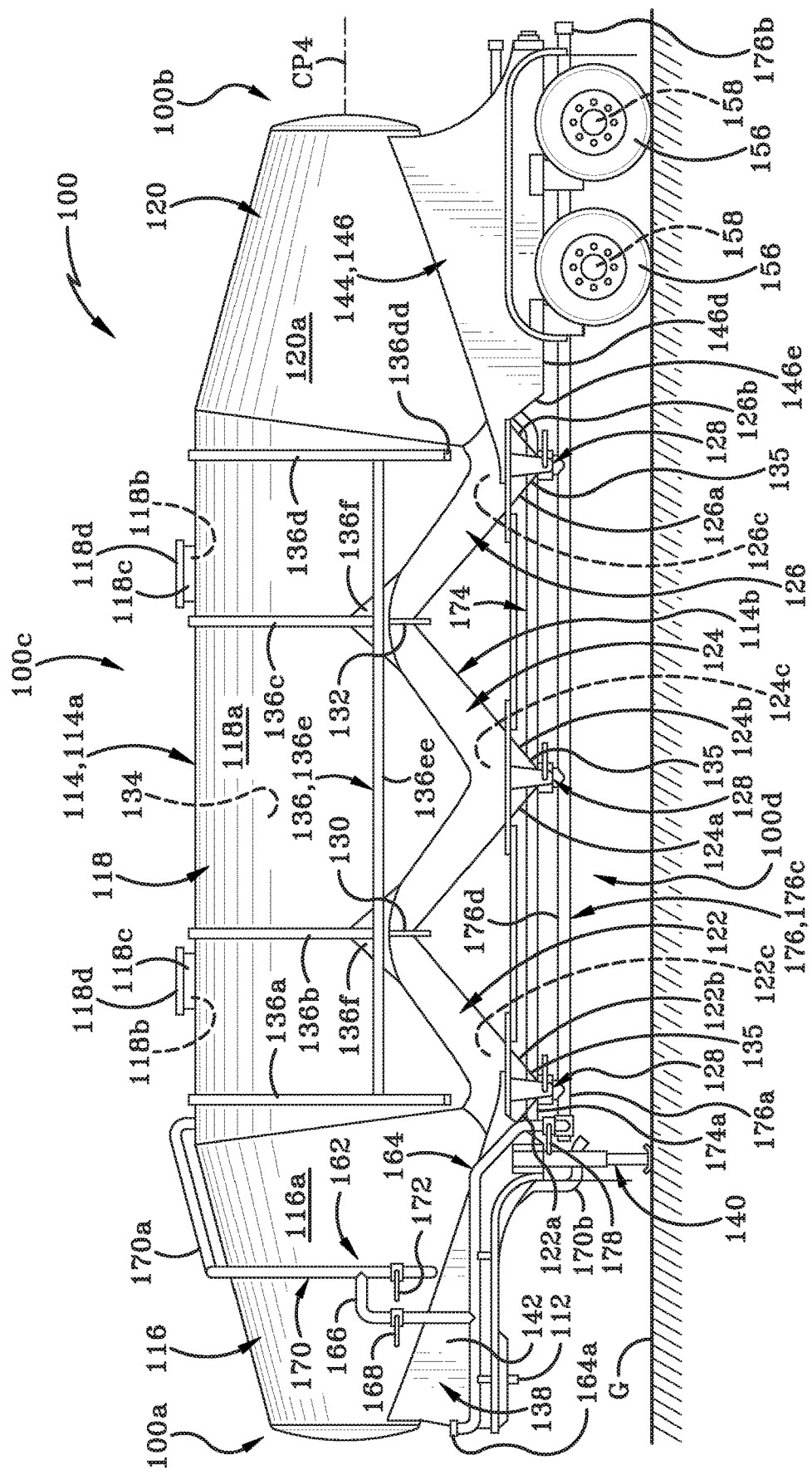
FIG. 8 is a side elevation view of a dry bulk tank in accordance with one aspect of the present disclosure Similar numbers refer to similar parts throughout the drawings.

FIG. 1-FIG. 3 show a PRIOR ART bulk tank trailer, FIG. 4-FIG. 5 show another example of a PRIOR ART bulk tank trailer and FIG. 6-FIG. 8 show a bulk tank trailer in accordance with the present disclosure.

The term "trailer" will be used throughout the rest of the specification to reference either of the PRIOR ART bulk tank trailer or the bulk tank trailer in accordance with the present disclosure. However, it should be understood that the terms "trailer", "bulk tank trailer", "tanker", "tank", "truck", or "vehicle" may be used interchangeably herein.

Referring to FIG. 1-FIG. 3, the PRIOR ART bulk tank trailer will be described in greater detail and is generally indicated in these figures by the reference number 10. Bulk tank trailer 10 may be similarly configured to a bulk tank trailer described in U.S. patent application Ser. No. 15/056,496 filed Feb. 29, 2016 and assigned to the same Applicant as the present disclosure. U.S. patent application Ser. No. 15/056,496 is entitled "Pneumatic Tank with Tension Bar", and the disclosure of this application is incorporated herein by reference.

Trailer 10 may be a towed vehicle which is towed by a towing vehicle such as an on-road tractor (not shown)

whereby trailer 10 and the tractor may form a tractor trailer rig in the form of a dry bulk tanker to transport dry particulate or granular materials. The bulk tank trailer 10 may include a front end 10a and a rear end 10b defining a longitudinal direction therebetween, a top end 10c and a bottom end 10d defining a vertical direction therebetween and a left side 10e (FIG. 3) and a right side 10f (FIG. 3) defining a transverse direction therebetween. Front end 10a may be pivotally hitched to a rear end of tractor via a hitch member 12. Hitch member 12 may be any suitable type of hitch such as a fifth wheel hitch.

For clarity, an explanation of some terms used herein is provided. Trailer 10 may include an imaginary central plane CP1 (FIG. 3) which may be a vertical longitudinally extending plane cutting through the center of trailer 10 midway between the left and right sides 10e and 10f thereof. As is readily evident from the Figures, various components may be transversely offset or spaced from central plane CP1. The description of trailer 10 may make reference to certain components, sides, surfaces, points and the like as being inboard or outboard of one another, or this may be readily apparent from the Figures even without specific description. Such terms typically relate to the left or right halves of trailer 10 whereby, for instance, with regard to the left half (left of central plane CP1), a first point which is outboard of a second point is further to the left than the second point or further outboard than the second point in a first or left outboard direction, and thus the second point is inboard of or to the right of the first point. Thus, within the left half, the first point is further outboard or further from central plane CP1 than is the second point. Likewise, with regard to the right half (right of central plane CP1), a third point which is outboard of a fourth point is further to the right than the fourth point or further outboard than the fourth point in a second or right outboard direction, and thus the fourth point is inboard of or to the left of the third point. Thus, within the right half, the third point is further outboard or further from central plane CP1 than is the fourth point.

Various surfaces may be said to face transversely inward or transversely outward, which may respectively mean facing generally toward or away from the imaginary central plane CP1. Thus, on the left half of trailer 10, a surface which faces transversely inward may be said to face generally to the right or rightward, and a surface which faces transversely outward may be said to face generally to the left or leftward. On the right half of trailer 10, a surface which faces transversely inward may be said to face generally to the left or leftward, and a surface which faces transversely outward may be said to face generally to the right or rightward.

Similarly, various components, surfaces etc. may be said to extend transversely inward or transversely outward, which may respectively mean extending generally toward or away from central plane CP1. Thus, on the left half of trailer 10, a component that extends transversely inward may be said to extend generally to the right or rightward, and a component that extends transversely outward may be said to extend generally to the left or leftward. On the right half of trailer 10, a component that extends transversely inward may be said to extend generally to the left or leftward, and a component etc. which extends transversely outward may be said to extend generally to the right or rightward.

Further explanation is provided with respect to references to the longitudinal direction of trailer 10. Certain components of trailer 10 are further forward or rearward of other components, or may be at the same location along a longitudinal axis (where the longitudinal axis extends between front end 10a and rear end 10b. Thus, for example, a reference to two points, surfaces, components or the like being "at the same longitudinal position" or "at the same longitudinal location" means that the two points, surfaces, components or the like are at the same position along the longitudinal axis while they may be at different transverse positions, that is, spaced to the left or right of one another, or spaced upwardly or downwardly of one another. Similarly, a reference to two points, surfaces, components or the like being "longitudinally adjacent" one another means that the two points, surfaces, components or the like are at or adjacent the same position along the longitudinal axis while they may be at different transverse positions or spaced upwardly or downwardly of one another. It is also noted that the term U-shaped or U-shaped configuration may be used herein to mean an upright U-shape or U-shaped configuration and the term inverted U-shaped configuration may be used herein to mean an upside down U-shaped configuration.

With primary reference to FIG. 1-FIG. 3, trailer 10 may include a rigid tank assembly 14. Tank assembly 14 may include an imaginary central plane CP2 (FIG. 2) which may be a horizontal longitudinally extending plane cutting through the center of tank assembly 14 midway between a top end 14a and a bottom end 14b of the tank assembly 14. In accordance with one aspect of the present disclosure, various components may be vertically offset or spaced from the central plane CP2.

The description of trailer 10 may make reference to certain components, sides, surfaces, points and the like as being above or below one another, or this may be readily apparent from the Figures even without specific description. Such terms typically relate to the top or bottom halves of the tank assembly 14 whereby, for instance, with regard to the top half (above central plane CP2), a first point which is vertically above a second point is further vertically upwards than the second point, and thus the second point is vertically below the first point. Thus, within the top half, the first point is further vertically upwards or further from the central plane CP2 than is the second point. Likewise, with regard to the bottom half (bottom of central plane CP2), a third point which is vertically below a fourth point is further vertically downwards than the fourth point, and thus the fourth point is vertically above the third point. Thus, within the bottom half, the third point is vertically downwards or further from the central plane CP2 than is the fourth point.

Tank assembly 14 may further include a front end housing 16, a central section 18, and a rear end housing 20. Front end housing 16 may extend forwardly from the central section 18 and rear end housing 20 may extend rearwardly from the central section 18. Front end housing 16, central section 18 and rear end housing 20 may be formed from a plurality of differently shaped sheet metal sections that are welded together to form the illustrated exterior shape of tank assembly 14.

Front end housing 16 forms a nose cone on tank assembly 14. Housing 16 includes an exterior wall 16a that bounds and defines an interior front chamber (not shown).

Central section 18 may include an inverted, generally U-shaped upper wall 18a. Upper wall 18a may bound and define a generally U-shaped interior space (not shown). The top region of upper wall 18a may define one or more manhole openings 18b therein. Manhole openings 18b may be in fluid communication with interior space. Manholes 18c may extend upwardly and outwardly from the top region of upper wall 18a and covers 18d may be selectively engageable with manholes 18c.

Rear end housing 20 may extend longitudinally rearwardly from central section 18. Rear end housing 20 may include an exterior wall 20a that bounds and defines an interior space (not shown).

One or more hoppers may be welded to and extend downwardly from a lower end of upper wall 18a of central section 18. Trailer 10 may be configured with one, two, three, or more than three hoppers. As illustrated in FIG. 1, trailer 10 may include a first hopper 22, a second hopper 24, and a third hopper 26. Central plane CP1 may cut through the transverse center of each of hoppers 22, 24 and 26 midway between the left side 10e and the right side 10f of trailer 10. First hopper 22 may be located closest to front end housing 16, second hopper 24 may be located longitudinally rearwardly of first hopper 22 and generally centrally relative to central section 18, and third hopper 26 may be located longitudinally rearwardly of second hopper 24 and closest to rear end housing 20.

First, second and third hoppers 22, 24, 26 may be generally aligned along a longitudinal axis of tank assembly 14, where the longitudinal axis is aligned along central plane CP1 and extends from front end 10a to rear end 10b of trailer 10. Each hopper 22, 24, 26 may be formed with a truncated generally conical exterior wall that tapers in width from the lower end of upper wall 18a towards a bottom 10d of trailer 10. The term "conical" as used herein should be understood to describe a hopper that has a circumferential surface that is curved or that partially includes a curved surface and partially includes flat surfaces or that entirely includes flat surfaces that are oriented at angles to each other. Hoppers 22, 24, 26 will be further described later herein.

With reference to FIG. 1, the conical exterior wall of first hopper may include a front region 22a and an opposed rear region 22b. An opening (not shown) may be defined at a bottom end of the conical exterior wall. The conical exterior wall of first hopper 22 may bound and define an interior space 22c and opening is in fluid communication with interior space 22c. A valve assembly 28 (FIG. 1) may be provided at the bottom end of first hopper 22 to close off access to interior space 22c. Front region 22a of the conical exterior wall of first hopper 22 angles forwardly and upwardly and is welded at its uppermost end to an interior surface of the top region of upper wall 18a. The front region 22a forms a rearmost wall of front end housing 16.

Referring still to FIG. 1, the conical exterior wall of second hopper 24 may include a front region 24a and a rear region 24b and an opening (not shown) defined in the bottom end of the conical wall. The conical exterior wall of second hopper 24 may bound and define an interior space 24c and opening may be in fluid communication with interior space 24c. A valve assembly 28 (FIG. 1) may be provided at the bottom end of second hopper 24 to close off access to interior space 24c.

An upper end of rear region 22b of first hopper 22 and an upper end of front region 24a of second hopper 24 may be welded to each other and to a first plate 30. First plate 30 may extend transversely across the interior of tank assembly 14. The ends of first plate 30 may be welded to opposing regions of the interior surface of upper wall 18a. First plate 30 may be of a substantially constant height from an upper end thereof to a lower end thereof. First plate 30 may comprise a substantially solid and substantially uninterrupted piece of metal (i.e., substantially no holes, openings or slots being defined therein).

The conical exterior wall of third hopper 26 may include a front region 26a and a rear region 26b. An opening (not shown) may be defined in the bottom end of the conical wall. The conical exterior wall of third hopper 26 may bound and define an interior space 26c and opening may be in fluid communication with interior space 26c. A valve assembly 28 (FIG. 1) may be provided at the bottom end of third hopper 26 to close off access to interior space 26c.

An upper end of rear region 24b of second hopper 24 and an upper end of front region 26a of third hopper 26 may be welded to each other and to a second plate 32. Second plate 32 may be of a substantially identical configuration to first plate 28 and second plate 32 may extend transversely across the interior of tank assembly 14 and the ends of second plate 32 are welded to opposing regions of the interior surface of upper wall 18a. Second plate 32 may be of a substantially constant height from an upper end thereof to a lower end thereof. Second plate 32 may comprise a substantially solid and substantially uninterrupted piece of metal (i.e., substantially no holes, openings or slots being defined therein). First plate 30 and second plate 32 may be substantially parallel to each other and at right angles to the longitudinal axis of trailer 10. First plate 30 and second plate 32 may also be longitudinally spaced a distance apart from each other. Most of first plate 30 and most of second plate 32 is located within the interior of tank assembly 14. However, a portion of first plate 30 projects downwardly from the junction between rear region 22b of first hopper 22 and front region 24a of second hopper 24 and a portion of second plate 32 projects downwardly from the junction between rear region 24b of second hopper 24 and front region 26a of third hopper 26.

Rear region 26b of third hopper 26 may extend upwardly and rearwardly from the bottom 10d of trailer 10 to the interior surface of a top region of upper wall 18. Rear region 26b is welded to the interior surface of upper wall 18 and forms a rearmost wall of central section 18 and a frontmost wall of rear end housing 20.

Interior space defined by upper wall 18a, interior space 22c defined by first hopper 22, interior space 24c defined by second hopper 24 and interior space 26c defined by third hopper 26 form a storage compartment 34 for tank assembly 14. Storage compartment 34 may be suitable for carrying dry bulk materials therein. The one or more manholes 18c may provide a way for dry bulk materials to be loaded into storage compartment 34 and the openings provide a way for those dry bulk materials to be removed from storage compartment 34.

Chamber of front end housing 16 may be completely separate from storage compartment 34 and chamber of rear end housing 20 may be completely separate from storage compartment 34. Each valve assembly 28 may be individually movable between an open position and a closed position. For example, with respect to first hopper 22, when the associated valve assembly 28 is moved to the open position, bulk material from interior space 22c of first hopper 22 may be able to flow through opening. When the associated valve assembly 28 is closed, bulk material may no longer flow out of opening. An aerator 35 may also be engaged with each bottom end of each hopper 22, 24, 26. The aerators 35 may be provided to selectively agitate the bulk materials stored in the associated hopper. The aerator 35 on a particular hopper, such as first hopper 22, may be actuated prior to opening the associated valve assembly 28. The aerator 35 may stir up the particulate materials within first hopper 22 and effectively fluidize them, thereby making it easier for the particulate materials to flow out through opening when the associated valve assembly 28 is moved to the open position.

As shown in FIG. 1, a strengthening assembly 36 may be welded to the exterior surface of central section 18. Strengthening assembly 36 may include a plurality of inverted U-shaped ribs 36a, 36b, 36c, and 36d; a pair of horizontally oriented bars (only one of which is shown as 36e), and a plurality of gusset plates 36f. Rib 36d may include a bottom edge 36dd extending substantially along a width of the at least one vertically oriented rib 36d. The horizontally oriented bar 36e may include a bottom edge 36ee extending substantially along a length of the horizontally oriented bar 36e. Typically, four generally triangular gusset plates 36f may be provided as part of strengthening assembly 36 with each gusset plate 36f being located where two adjacent hoppers are connected to each other. Gusset plates 36f may also strengthen the area of the exterior of tank assembly 14 where the first and second plates 30, 32 are welded to upper wall 18a and the front and rear regions of the adjacent hoppers 22, 24 or 26.

Ribs 36a, 36b, 36c and 36d may be welded to the exterior surface of upper wall 18a and may be spaced at intervals longitudinally from each other. Ribs 36a, 36b, 36c and 36d may be oriented at right angles to the longitudinal axis. Bar 36e and the other bar (not shown) may be located on opposite sides 10e, 10f of trailer 10 and may be welded to upper wall 18a, to ribs 36a, 36b, 36c and 36d and to gusset plates 36f. As indicated above, each gusset plate 36f may be located at the intersection of two adjacent hoppers, such as first hopper 22 and second hopper 24 or second hopper 24 and third hopper 26. Gusset plates 36f may be welded to upper wall 18a, one of the ribs 36b or 36c and portions of the adjacent hoppers conical exterior walls. Each gusset plate 36f may be positioned exteriorly of the location where an end of first plate 30 or second plate 32 is welded to the upper wall 18a and associated hopper conical exterior walls. Strengthening assembly 36 may be provided to help the exterior wall of tank assembly 14 withstand the stresses and strains placed on it during transportation of a load and during loading and unloading of the storage compartment 34.

Front end housing 16, central section 18, rear end housing 20, hoppers 22, 24, 26, strengthening assembly 36 amongst other components on tank assembly 14 may be formed primarily of a metal, for instance, an aluminum alloy or any other suitable metal.

Tank assembly 14 may include a front frame 38, which may be referred to as a hitch mounting frame (for mounting hitch member 12 thereon), a landing gear mounting frame (for mounting landing gear 40 thereon) or a hitch and landing gear mounting frame (for mounting hitch member 12 and landing gear 40 thereon). Landing gear 40 may be any suitable type known in the art and may be configured to move between a lowered position (FIG. 1) in contact with the ground "G" for supporting front end 10a of trailer 10 when disconnected from the tractor or other towing vehicle; and a raised position (not shown) out of contact with the ground "G" when trailer 10 is hitched to the tractor/towing vehicle for over the road travel. Front frame 38 may be a rigid structure and may be formed primarily of an aluminum alloy or other suitable metal. Front frame 38 may include various components including a front left rail 42 and a front right rail (not shown). Front frame 38 may be rigidly secured to and extend downward from a lower portion of front end housing 16 and front region 22a of first hopper 22.

Tank assembly 14 may include a rear frame 44. Rear frame 44 may be a rigid structure and may be formed primarily of an aluminum alloy or other suitable metal. Rear frame 44 may be rigidly secured to and extend downward from a lower portion of rear end housing 20 and a lower rear region 26b of third hopper 26. Rear frame 44 may include various components including a left rear rail 46, a right rear rail 48, at least one intermediate support member 50, at least one rear support plate 52 and at least one frame member 54. The left rear rail 46 may include a bottom edge 46d extending substantially along a length of the left rear rail 46. The at least one rear support plate 52 may include a bottom edge 52a.

Trailer 10 may include left and right sets of ground engaging wheels 56. Trailer may include at least one straight horizontal transversely extending rear axle 58 and at least one suspension assembly 60. The at least one straight horizontal transversely extending rear axle 58 may include a top edge 58a extending substantially along a length of the at least one straight rear wheel axle 58. In this PRIOR ART embodiment, the trailer 10 may include two straight rear axles 58. Trailer 10 may further include an imaginary plane P1 (FIG. 2) which may be a horizontal longitudinally extending plane cutting through the center of the rear axles 58. Trailer 10 may further include an imaginary axis X1 (FIG. 3) which may be a horizontal transversely extending axis that lies along plane P1.

The rear axles 58 may be operatively connected to the suspension assembly 60 and the suspension assembly 60 may be connected to the rear frame 44 via hanger brackets 60a. Left and right sets of ground engaging wheels 56 may be operatively connected to the rear axles 58.

An air piping system 62 is provided on trailer 10. Air piping system is provided to aid in the removal of the bulk load carried within storage compartment 34 of tank assembly 14. Air piping system 62 includes a plurality of different pipes, hoses, lines and valves (as will be discussed hereafter). Air piping system 62 may be connected to an air/pneumatic pump or compressor (not shown) which may be mounted on the towing vehicle or tractor or elsewhere. The pump typically will be located upstream of air piping system 62 and storage compartment 34.

Air piping system 62 includes an air intake pipe 64 that may be selectively placed in fluid communication with the upstream pump. A hose (not shown) may be engaged with the pump at one end and with a first end 64a of air intake pipe 64 at the other end. A top air pipe 66 branches off air intake pipe 64 and a first valve 68 is engaged with top air pipe 66. Top air pipe 66 terminates in a blowdown pipe 70 and is in fluid communication therewith. A first branch 70a of blowdown pipe 70 extends upwardly from top air pipe 66 and first branch 70a terminates in the interior of storage compartment 34. First branch 70a of blowdown pipe 70 enters tank assembly 14 through inlet (not shown) defined in central section 18. A second branch 70b of blowdown pipe 70 enters front end housing 16 through an inlet (not shown) and subsequently exits front end housing 16 through one of the openings in a lower wall of front end housing 16. Second branch 70b terminates at an open end 70c. A second valve 72 is engaged with second branch 70b of blowdown pipe 70.

First and second valves 68 and 72 may each be selectively and individually moved between an open position and a closed position. When first valve 68 is in the open position and second valve 72 is in the closed position, air may flow from air intake pipe 64, through top air pipe 66, through first branch 70a of blowdown pipe 70 and into storage compartment 34. The pump may be activated to pressurize storage compartment 34 by pumping air through top air pipe 66 and the first branch 70a of blowdown pipe 70 and into the interior of storage compartment 34. Storage compartment 34 is pressurized from the top to push particulate material out of the openings in the bottom end of the hoppers as will be discussed later herein.

When first valve 68 is moved to the closed position, air no longer can flow through top air pipe 66, through first branch 70a of blowdown pipe 70 and into storage compartment 34. When first valve 68 is in the closed position and second valve 72 is also in the closed position, air pressure within storage compartment 34 remains substantially constant. If it is desired to depressurize storage compartment 34, first valve 68 is maintained in the closed position and second valve 72 is moved to the open position. This allows air to flow out of storage compartment 34, through first branch 70a of blowdown pipe 70, through second branch 70b of blowdown pipe 70 and out of the open end 70c thereof and into the air below tank assembly 14.

Referring still to FIG. 1, air piping system 62 further includes an aerator supply pipe 74 that originates at 74a in air intake pipe 64 and connects to aerators 35 engaged with the bottom ends of each of the first, second and third hoppers 22, 24, 26 and terminates in an end 74b. When one of the aerators 35 is activated, air will flow through aerator supply pipe 74 and into the chamber of the associated hopper 22, 24 or 26 to stir up the bulk material in the chamber. This helps to fluidize the bulk material so that is more readily able to flow out of an opening at the bottom of the associated hopper 22, 24 or 26.

Air piping system 62 further includes a discharge pipe 76 that originates in air intake pipe 64. In this PRIOR ART embodiment, the discharge pipe 76 may include a first end 76a, a second end 76b, a first straight portion 76c, a bent portion 76d, a second straight portion 76e, and a top edge 76f extending substantially along a length of the discharge pipe 76. Discharge pipe 76 is mounted to rear frame 46 with a hanger bracket 77. Air piping system 62 may include an imaginary plane P3 (FIG. 2) which may be a horizontal longitudinally extending plane cutting through the center of the first straight portion 76c. Air piping system 62 may include an imaginary plane P4 (FIG. 2) which may be a horizontal longitudinally extending plane cutting through the center of the second straight portion 76e.

In one example, the discharge pipe 76 may be positioned closer to the bottom edge 52a of the at least one rear support plate 52 and the top edge 58a of the at least one straight rear wheel axle 58. In one example, the air piping system 62 is operatively connected to the interior storage compartment 34 and the discharge pipe 76 and the entire air piping system 62 is not positioned above the top edge 58a of the at least one straight rear wheel axle 58 and the horizontal transversely extending plane P1. In one example, the valve assembly 28 may be operatively connected with the interior storage compartment 34 and the discharge pipe 76 and the entire valve assembly 28 is not positioned above the top edge 58a of the at least one straight rear wheel axle 58 and the horizontal transversely extending plane P1.

A bottommost point of the first straight portion 76c is a vertical distance D1 away from the ground G. Plane P3 is a vertical distance D2 away from the ground G. Plane P3 is a vertical distance D3 away from P1. Plane P1 is a vertical distance D4 away from plane P4. Plane P1 is a vertical distance D5 away from central plane CP2. Plane P4 is a vertical distance D6 away from the ground G. The top edge 76f is a varying vertical distance D7 from the bottom edge 46d of the left rear rail 46. In other words, D7 is not a substantially constant vertical distance from the bottom edge 46d of the left rear rail 46. The top edge 76f of the discharge pipe 76 is a varying vertical distance D8 from the horizontal longitudinally extending central plane CP2. In other words, distance D8 is not a substantially constant vertical distance from the horizontal longitudinally extending central plane CP2. The top edge 76f of the discharge pipe 76 is a varying vertical distance D9 from the bottom edge 36dd of the vertically oriented rib 36d. In other words, distance D9 is not a substantially constant vertical distance from the bottom edge 36dd of the vertically oriented rib 36d. The top edge 76f of the discharge pipe 76 is a varying vertical distance D10 from the bottom edge 36ee of the horizontally oriented bar 36e. In other words, distance D10 is not a substantially constant vertical distance from the bottom edge 36ee of the horizontally oriented bar 36e.

A discharge valve 78 is engaged with air intake pipe 64 proximate the first end 76a thereof and discharge valve 78 is movable between an open position and a closed position. Discharge pipe 76 is also engaged with the valve assemblies 28 located at the bottom end of each of the first, second and third hoppers 22, 24, and 26. Each valve assembly 28 is selectively movable between an open position and a closed position. Discharge pipe 76 terminates in the open end 76b that is located at a rear end 10b of trailer 10. When one of the valve assemblies 28 is moved to the open position, the chamber of the associated hopper 22, 24 or 26, and thereby storage compartment 34, is placed in fluid communication with discharge pipe 76. When the valve assembly 28 is moved to the closed position then fluid communication between discharge pipe 76 and the chamber of the associated hopper 22, 24 or 26 and thereby with storage compartment 34 is broken.

When discharge valve 78 is in the open position, discharge pipe 76 is placed in fluid communication with air intake pipe 64 and air may flow from the pump through air intake pipe 64 and through discharge pipe 76 under pressure. If the valve assembly 28 associated with first hopper 22, for example, is moved to the open position, bulk material will flow out of the storage compartment 34 through the valve assembly 28 of first hopper 22 and into discharge pipe 76. The pressurized air flowing through discharge pipe 76 will entrain some of the bulk material and cause the bulk material to flow through discharge pipe 76 and out of open end 76b.

PRIOR ART trailer 10 is used in the following manner. When trailer 10 arrives at a facility to be loaded with particulate bulk material, trailer 10 is positioned so that at least one of manholes 18c is located directly under an opening of a loading hose or pipe. Cover 18d of the at least manhole 18c is removed and dry, particulate, bulk material is loaded into storage compartment 34 through the at least one manhole 18c. Cover 18d is then replaced on each of the at least one manhole 18c to seal storage compartment 34. Trailer 10 is then driven across the roads to a second facility where the bulk particulate material is to be delivered.

The operator will connect a hose from a storage bin at the second facility to end 76b of discharge pipe 76. Discharge valve 78 is moved to the closed position if it is not already in that position. First and second valves 68 and 72 are also placed in the closed position if they were not already in that position. A hose is connected from a pump to first end 64a of air intake pipe 64 and the pump is actuated. Air flows through air intake pipe 64 and because discharge valve 78 is closed, the air will flow through aerator supply pipe 74. In one example method, a first one of the aerators 35 is activated to agitate the particulate material within the associated hopper 22, 24 or 26. Air will therefore flow from air intake pipe 64 through the activated aerator 35 and into the chamber of the associated hopper 22, 24 or 26. When the aerator 35 has been running for a few minutes, discharge valve 78 is moved to the open position and the valve assembly 28 on the hopper 22, 24 or 26 that has been aerated will be moved to the open position. (The aerator 35 will be deactivated prior to or after the valve assembly 28 on that hopper has been moved to the open position.) The first valve 68 may also be moved to the open position so that air flows in to the upper end of storage compartment 34 to pressurize storage compartment 34. The bulk material in the opened hopper 22, 24 or 26 flows out through the opened valve assembly 28 and into the discharge pipe 76. The air flowing through discharge pipe 76 picks up the bulk material from the hopper and carries it through the first straight portion 76c, the bent portion 76d and the second straight portion 76e of the discharge pipe 76, out of the open end 76b, and into and through the hose connected to the storage tank in the second facility.

When substantially all of the loose material in the opened hopper has flowed into the discharge pipe 76 the valve assembly 28 associated with that opened hopper will be closed as will the discharge valve 78. The aerator 35 engaged with another one of the hoppers will be activated and the process will be repeated until that hopper is substantially emptied. The steps will be repeated once again for the final hopper. When substantially all of the bulk material has been removed from the storage compartment 34 through the three hoppers 22, 24, 26, discharge valve 78 will be kept in the open position so that air continues to flow through discharge pipe 76. The operator will leave first valve 68 in the open position for a while to ensure that air continues to be moved from air intake pipe 64 through top air pipe 66, through blowdown pipe 70 and into storage compartment 34. The air flowing into storage compartment 34 through blowdown pipe 70 will help dislodge any material that remains in any of the hoppers 22, 24, 26. That dislodged material will flow into the discharge pipe 76. The material then flows through the first straight portion 76c, the bent portion 76d, the second straight portion 76e, and the open end 76b into the hose connected to end 76b. The particulate material travels over the straight rear wheel axle 58.

First valve 68 will then be closed and second valve 72 will be opened to depressurize storage compartment 34. The pump will be switched off, all valves 68, 72 and 78 will be closed and the hoses engaged with first end 64a of air intake pipe 64 and with end 76b of discharge pipe 76 will be disengaged. Trailer 10 is then free to travel back to the loading facility to take on its next load.

It will be understood that in other example methods of emptying a load from trailer 10, more than one of the aerators and more than one of the hoppers may be opened at the same time instead of opening the aerators and hoppers in sequence one at a time. In some example methods, the rearmost hopper (i.e., hopper 26 in the PRIOR ART figures) may be opened first and then the middle hopper (second hopper 24) and then the first hopper 22. In other example methods, the hoppers may be opened in the opposite sequence starting with the first hopper 22, then the second hopper 24 and finally the third hopper 26.

One of the issues with PRIOR ART tank trailers such as bulk tank trailer 10 is that the bent portion 76d of the discharge pipe often wears out. As the materials are being discharged, the materials contact the bent portion 76d of the discharge pipe 76 which frictionally abrades the bent portion 76d of discharge pipe 76. This abrasion may cause a need for the discharge pipe 76 to be replaced.

FIG. 4 and FIG. 5 show a different embodiment of a PRIOR ART bulk tank trailer and is generally indicated in these figures by the reference number 10A. PRIOR ART bulk tank trailer 10A is substantially identical to PRIOR ART bulk tank trailer 10 in structure and function with a few exceptions/additions that will be discussed hereafter in greater detail.

PRIOR ART bulk tank trailer 10A includes a different rear axle. PRIOR ART bulk tank trailer 10A may include at least one horizontal transversely extending rear axle 80 having a bent or "humped" portion 80a. The at least one horizontal transversely extending rear axle 80 may include a top edge 80b extending substantially along a length of the at least one rear wheel axle 80. In this PRIOR ART embodiment, the trailer 10 may include two bent or humped rear axles 80. In this PRIOR ART embodiment, plane P1 (FIG. 4) is a horizontal longitudinally extending plane cutting through the center of straight portions of the rear axles 80 and axis X1 (FIG. 4) is a horizontal transversely extending axis cutting through the center of the straight portions of the rear axles 80.

PRIOR ART bulk tank trailer 10A includes a different discharge pipe than the discharge pipe 76 of PRIOR ART bulk tank trailer 10. Discharge pipe of PRIOR ART bulk tank trailer 10A is generally indicated in FIG. 4-FIG. 5 as 82. In this PRIOR ART embodiment, the discharge pipe 82 may include a first end (not shown), a second end 82b, a straight portion 82c and a top edge 82d. Discharge pipe 82 is mounted to rear frame 46 with a hanger bracket 77. Air piping system 62 may include an imaginary plane P5 (FIG. 4) which may be a horizontal longitudinally extending plane cutting through the center of the straight portion 82c.

In one example, the discharge pipe 82 may be positioned closer to the top edge 80b of the at least one rear wheel axle 80 than the bottom edge 52a of the at least one rear support plate 52. In one example, the air piping system 62 is operatively connected to the interior storage compartment 34 and the discharge pipe 82 and the entire air piping system 82 is not positioned above the top edge 80b of the at least one rear wheel axle 80 and the horizontal transversely extending plane P1. In one example, the valve assembly 28 may be operatively connected with the interior storage compartment 34 and the discharge pipe 82 and the entire valve assembly 28 is not positioned above the top edge 80b of the at least one rear wheel axle 80 and the horizontal transversely extending plane P1.

A bottommost point of the straight portion 82c is a vertical distance D11 away from the ground G. Plane P5 is a vertical distance D12 away from P1. Plane P1 is a vertical distance D13 away from central lane CP2. Plane P5 is a vertical distance D14 away from the ground G. The top edge 80b of the at least one rear wheel axle 80 is a varying vertical distance from the bottom edge 46d of the left rear rail 46. In other words, distance D15 is not a substantially constant vertical distance from the bottom edge 46d of the left rear rail 46. The top edge 80b of the at least one rear wheel axle 80 is a varying vertical distance from the horizontal longitudinally extending central plane CP2. In other words, distance D16 is not a substantially constant vertical distance from the horizontal longitudinally extending central plane CP2. The top edge 80b of the at least one rear wheel axle 80 is a varying vertical distance from the bottom edge 36dd of the vertically oriented rib 36d. In other words, distance D17 is not a substantially constant vertical distance from the bottom edge 36dd of the vertically oriented rib 36d. The top edge 80b of the at least one rear wheel axle 80 is a varying vertical distance from the bottom edge 36ee of the horizontally oriented bar 36e. In other words, distance D18 is not a substantially constant vertical distance from the bottom edge 36ee of the horizontally oriented bar 36e.

In operation, the PRIOR ART bulk tank trailer 10A operates in a substantially identical manner to PRIOR ART bulk tank trailer 10, except that the discharge pipe 82 passes under the bent portion 80a of the axle 80 which allows the discharge pipe 82 to be straight. The bulk material flows into the discharge pipe 82. The material then flows through the straight portion 80c and the open end 80b into the hose connected to end 80b. The particulate material travels under the bent portion 80a of the axle 82.

One of the issues with PRIOR ART tank trailers such as bulk tank trailer 10A is that the discharge pipe 82 is at a low vertical distance to the ground G and the humped or bent axle 80 is heavy and expensive.

FIG. 6-FIG. 8 illustrate a tank trailer in accordance with the present disclosure, generally indicated at 100. Trailer 100 is similar to the PRIOR ART trailers (10 and 10A) in some respects but is also very different in other respects. The differences between the PRIOR ART trailers (10 and 10A) and trailer 100 will be described in detail hereafter.

For clarity, an explanation of some terms used herein is provided. Trailer 100 may include an imaginary central plane CP3 (FIG. 7) which may be a vertical longitudinally extending plane cutting through the center of trailer 100 midway between a left side 100e and a right side 100f thereof. As is readily evident from the Figures, various components may be transversely offset or spaced from central plane CP3. The description of trailer 100 may make reference to certain components, sides, surfaces, points and the like as being inboard or outboard of one another, or this may be readily apparent from the Figures even without specific description. Such terms typically relate to the left or right halves of trailer 100 whereby, for instance, with regard to the left half (left of central plane CP3), a first point which is outboard of a second point is further to the left than the second point or further outboard than the second point in a first or left outboard direction, and thus the second point is inboard of or to the right of the first point. Thus, within the left half, the first point is further outboard or further from central plane CP3 than is the second point. Likewise, with regard to the right half (right of central plane CP3), a third point which is outboard of a fourth point is further to the right than the fourth point or further outboard than the fourth point in a second or right outboard direction, and thus the fourth point is inboard of or to the left of the third point. Thus, within the right half, the third point is further outboard or further from central plane CP3 than is the fourth point.

Various surfaces may be said to face transversely inward or transversely outward, which may respectively mean facing generally toward or away from the imaginary central plane CP3. Thus, on the left half of trailer 100, a surface which faces transversely inward may be said to face generally to the right or rightward, and a surface which faces transversely outward may be said to face generally to the left or leftward. On the right half of trailer 100, a surface which faces transversely inward may be said to face generally to the left or leftward, and a surface which faces transversely outward may be said to face generally to the right or rightward.

Similarly, various components, surfaces etc. may be said to extend transversely inward or transversely outward, which may respectively mean extending generally toward or away from central plane CP3. Thus, on the left half of trailer 100, a component that extends transversely inward may be said to extend generally to the right or rightward, and a component that extends transversely outward may be said to extend generally to the left or leftward. On the right half of trailer 100, a component that extends transversely inward may be said to extend generally to the left or leftward, and a component etc. which extends transversely outward may be said to extend generally to the right or rightward.

Further explanation is provided with respect to references to the longitudinal direction of trailer 100. Certain components of trailer 100 are further forward or rearward of other components, or may be at the same location along a longitudinal axis (where the longitudinal axis extends between a front end 100 (not shown) and a rear end 100b. Thus, for example, a reference to two points, surfaces, components or the like being "at the same longitudinal position" or "at the same longitudinal location" means that the two points, surfaces, components or the like are at the same position along the longitudinal axis while they may be at different transverse positions, that is, spaced to the left or right of one another, or spaced upwardly or downwardly of one another. Similarly, a reference to two points, surfaces, components or the like being "longitudinally adjacent" one another means that the two points, surfaces, components or the like are at or adjacent the same position along the longitudinal axis while they may be at different transverse positions or spaced upwardly or downwardly of one another.

With primary reference to FIG. 6-FIG. 8, trailer 100 may include a rigid tank assembly 114. Tank assembly 114 may include an imaginary central plane CP4 (FIG. 7) which may be a horizontal longitudinally extending plane cutting through the center of tank assembly 114 midway between a top end 114a and a bottom end 114b of the tank assembly 114. In accordance with one aspect of the present disclosure, various components may be vertically offset or spaced from the central plane CP4.

The description of trailer 100 may make reference to certain components, sides, surfaces, points and the like as being above or below one another, or this may be readily apparent from the Figures even without specific description. Such terms typically relate to the top or bottom halves of the tank assembly 114 whereby, for instance, with regard to the top half (above central plane CP4), a first point which is vertically above a second point is further vertically upwards than the second point, and thus the second point is vertically below the first point. Thus, within the top half, the first point is further vertically upwards or further from the central plane CP4 than is the second point. Likewise, with regard to the bottom half (bottom of central plane CP4), a third point which is vertically below a fourth point is further vertically downwards than the fourth point, and thus the fourth point is vertically above the third point. Thus, within the bottom half, the third point is vertically downwards or further from the central plane CP4 than is the fourth point.

Trailer 100 may include at least one valve assembly 128 (FIG. 6). The at least one valve assembly 128 may be provided at the bottom end of the first hopper (not shown), the second hopper (not shown) and the third hopper 126 to close off access to interior space 126c.

A strengthening assembly 136 may be welded to the exterior surface of central section 118 (only some of which is shown). Strengthening assembly 136 may include a plurality of inverted U-shaped ribs 136c and 136d; a pair of horizontally oriented bars (only one of which is shown as 136e), and a plurality of gusset plates 136f (only one of which is shown). The rib 136d may include a bottom edge 136dd extending substantially along a width of the at least one vertically oriented rib 136d. The horizontally oriented bar 136e may include a bottom edge 136ee extending substantially along a length of the horizontally oriented bar 136e.

Tank assembly 114 may include a rear frame 144. Rear frame 144 may be a rigid structure and may be formed primarily of an aluminum alloy or other suitable metal. Rear frame 144 may be rigidly secured to and extend downward from a lower portion of rear end housing 120 and a lower rear region 126b of third hopper 126. Rear frame 144 may include various components including a left rear rail 146, a right rear rail 148, at least one intermediate support member 150, at least one rear support plate 152 and at least one frame member 154.

In one particular embodiment, the left rear rail 146 may include a first or top edge 146a, a second edge 146b, a third edge 146c, a fourth or bottom edge 146d, a fifth edge 146e, a sixth edge 146f, and a seventh edge 146g.

The first edge 146a may be connected to the second edge 146b and the seventh edge 146g. The second edge 146b may be connected to the first edge 146a and the third edge 146c. The third edge 146c may be connected to the second edge 146b and the fourth edge 146d. The fourth edge 146d may be connected to the third edge 146c and the fifth edge 146e. The fifth edge 146e may be connected to the fourth edge 146d and the sixth edge 146f. The sixth edge 146f may be connected to the fifth edge 146e and the seventh edge 146g. The seventh edge 146g may be connected to the sixth edge 146f and the first edge 146a.

The first edge 146a may extend from the seventh edge 146g vertically upwards at an angle towards the second edge 146b. The angle may be any suitable angle. The first edge 146a may be a generally straight edge.

The second edge 146b may extend from the first edge 146a vertically downwards in an arcuate manner towards the third edge 146c. The curvature of the arc may be any suitable curvature.

The third edge 146c may extend from the second edge 146b vertically downwards generally perpendicular to the ground towards the fourth edge 146d. The third edge 146c may be a generally straight edge.

The fourth edge 146d may extend from the third edge 146c generally longitudinally towards the fifth edge 146e. In other words, the fourth or bottom edge 146d may extend substantially along a length of the left rear rail 146. The fourth edge 146d may be a generally straight edge.

The fifth edge 146e may extend from the fourth edge 146d vertically upwards at an angle towards the sixth edge 146f. The angle may be any suitable angle. The fifth edge 146e may be a generally straight edge.

The sixth edge 146f may extend from the fifth edge 146e generally longitudinally towards the seventh edge 146g. The sixth edge 146f may be a generally straight edge.

The seventh edge 146g may extend from the sixth edge 146f vertically upwards towards the first edge 146a. The seventh edge 146g may be a generally straight edge.

Although a particular configuration and orientation of left rear rail 146 has been described, it is envisioned that the left rear rail 146 may have any suitable configuration and orientation.

The right rear rail 148 is substantially identical in a mirrored manner to the left rear rail 146 and, for brevity purposes, will not be discussed herein.

In one particular embodiment, the tank assembly 114 may include a first intermediate support member 150a, a second intermediate support member 150b and a third intermediate support member 150c. The first intermediate support member 150a may be longitudinally forward from the second intermediate support member 150b and the second intermediate support member 150b may be longitudinally forward from the third intermediate support member 150c. Although a particular orientation of the three intermediate support members 150a, 150b, and 150c has been described, it is envisioned that the three intermediate support members 150a, 150b, and 150c may be positioned in any suitable manner. It is further envisioned that the three intermediate support members 150a, 150b, and 150c may be any suitable size and have any suitable configuration.

In one particular embodiment, the rear support plate 152 may have a first portion 152a, a second portion 152b, a third portion 152c, and a fourth portion 152d. The first portion 152a may be connected to the second portion 152b, the second portion 152b may be connected to the third portion 152c, and the third portion 152c may be connected to the fourth portion 152d. The first portion 152a may extend from the second portion 152b vertically upwards. The second portion 152b may extend from the first portion 152a towards the third portion 152c vertically downwards at an angle. The angle may be any suitable angle. The third portion 152c may extend from the second portion 152b generally longitudinally towards the rear end 100b of the trailer 100. The fourth portion 152d may extend vertically downwards and may include a bottom edge 152dd. Although a particular configuration and orientation of the rear support plate 152 has been described, it is envisioned that the rear support plate 152 may have any suitable configuration and orientation.

In one particular embodiment, the at least one frame member 154 may define a hole or opening 154a.

Although the front frame of the tank assembly 114 has not been described, it is envisioned that the front frame of the tank assembly 114 may have a similar configuration to the rear frame 144.

Trailer may include left and right sets of ground engaging wheels 156. Trailer 100 may include at least one straight horizontal transversely extending rear axle 158 and at least one suspension assembly 160. The at least one straight horizontal transversely extending rear axle 158 may include a top edge 158a extending substantially along a length of the at least one straight rear wheel axle 158. In this particular embodiment, the trailer 100 may include two straight rear axles 158. Trailer 100 may further include an imaginary plane P6 (FIG. 6) which may be a horizontal longitudinally extending plane cutting through the center of the rear axles 158. Trailer 100 may further include an imaginary axis X2 (FIG. 7) which may be a horizontal transversely extending axis that lies along plane P6.

The rear axles 158 may be operatively connected to the suspension assembly 160 and the suspension assembly 160 may be connected to the rear frame 144 via hanger brackets 160a.

Left and right sets of ground engaging wheels 156 may be operatively connected to the rear axles 158.

Trailer 100 may include an air piping system (not shown). Air piping system includes a discharge pipe 176 that originates in air intake pipe (not shown). In this particular embodiment, the discharge pipe 176 may include a first end (not shown), a second end 176b, a generally elongated straight portion 176c, and a top edge 176d extending substantially along a length of the discharge pipe 176. Discharge pipe 176 is mounted to rear frame 144 with a hanger bracket 177. Air piping system may include an imaginary plane P7 (FIG. 6) which may be a horizontal longitudinally extending plane cutting through the center of the straight portion 176c. In one example, the discharge pipe 176 may pass through the opening 154a.

In one example, the discharge pipe 176 may be positioned approximately midway between the bottom edge 152cc of the third portion 152c and the top edge 158a of the at least one straight rear wheel axle 158. In one example, the air piping system is operatively connected to the interior storage compartment 134 and the discharge pipe 176 and the entire air piping system may be positioned above the top edge 158a of the at least one straight rear wheel axle 158 and the horizontal transversely extending axis X2. In one example, a valve assembly 128 may be operatively connected with the interior storage compartment 134 and the discharge pipe 176 and the entire valve assembly 128 may be positioned above the top edge 158*a* of the at least one straight rear wheel axle 158 and the horizontal transversely extending axis X2.

A bottommost point of the straight portion 176*c* is a vertical distance D19 away from the ground G. Plane P7 is a vertical distance D20 away from P6. Plane P6 is a vertical distance D21 away from central plane CP4. Plane P7 is a vertical distance D22 away from the ground G. The top edge 176*d* is a substantially constant vertical distance D23 from the bottom edge 146*d* of the left rear rail 146. The top edge of the discharge pipe 176*d* is a substantially constant vertical distance D24 from the horizontal longitudinally extending central plane CP4. The top edge 158*a* of the at least one straight rear wheel axle 158 is a substantially constant vertical distance D25 from the bottom edge 146*d* of the left rear rail 146. The top edge 158*a* of the at least one straight rear wheel axle 158 is a substantially constant vertical distance D26 from the horizontal longitudinally extending central plane CP4. The top edge of the discharge pipe 176*d* is a substantially constant vertical distance D27 from the bottom edge 136*dd* of the vertically oriented rib 136*d*. The top edge 158*a* of the at least one straight rear wheel axle 158 is a substantially constant vertical distance D28 from the bottom edge 136*dd* of the vertically oriented rib 136*d*. The top edge of the discharge pipe 176*d* is a substantially constant vertical distance D29 from the bottom edge 136*ee* of the horizontally oriented bar 136*e*. The top edge 158*a* of the at least one straight rear wheel axle 158 is a substantially constant vertical distance D30 from the bottom edge 136*ee* of the horizontally oriented bar 136*e*.

In one particular embodiment, the discharge pipe 176 of the trailer 100 is at a greater vertical distance from the ground G compared to the discharge pipe 76 of the trailer 10 and the discharge pipe 80 of the trailer 10A which is more fully described below. The greater vertical distance of the discharge pipe 176 from the ground G is beneficial in that it allows the discharge pipe to be generally straight along its length and to pass over the straight rear axles 158. This is in contrast to the discharge pipe 76 of the trailer 10 which includes a bent portion 76*d* and the discharge pipe 80 of the trailer 10A which passes over humped or bent rear axles 80.

In one particular embodiment, the bottommost point of the straight portion 176*c* of the discharge pipe 176 is at a greater vertical distance from the ground G than the vertical distance of the bottommost point of the straight portion 82*c* of the discharge pipe 80 to the ground G and the vertical distance of the bottommost point of the first straight portion 76*c* of the discharge pipe 76 to the ground G. In other words, D11 is greater than D7 and D1.

In one particular embodiment, the central plane CP4 of the tank assembly 114 is at a greater vertical distance from the horizontal longitudinally extending plane cutting through the center of the rear axles 158 (P6) than the vertical distance of the central plane CP2 of the tank assembly 14 to the horizontal longitudinally extending plane cutting through the center of the rear axles 58 (P1) of the PRIOR ART tank trailers 10 and 10A. In other words, D13 is greater than D9 and D5.

In one particular embodiment, the horizontal longitudinally extending plane cutting through the center of the straight portion 176*c* (P7) is at a greater vertical distance from ground G than the horizontal longitudinally extending plane cutting through the center of the second straight portion 76*e* (P4) and the vertical distance of the horizontal longitudinally extending plane cutting through the center of the straight portion 82*c* (P5). In other words, D14 is greater than D10 and D6.

In one particular embodiment, the top edge 176*d* is a substantially constant vertical distance D23 from the bottom edge 146*d* of the left rear rail 146. This is in contrast to the bulk tank trailer 10 where the top edge 76*f* is a varying vertical distance D7 from the bottom edge 46*d* of the left rear rail 46.

In one particular embodiment, the top edge of the discharge pipe 176*d* is a substantially constant vertical distance D24 from the horizontal longitudinally extending central plane CP4. This is in contrast to the bulk tank trailer 10 where the top edge 76*f* of the discharge pipe 76 is a varying vertical distance D8 from the horizontal longitudinally extending central plane CP2.

In one particular embodiment, the top edge of the discharge pipe 176*d* is a substantially constant vertical distance D27 from the bottom edge 136*dd* of the vertically oriented rib 136*d*. This is in contrast to the bulk tank trailer 10 where the top edge 76*f* of the discharge pipe 76 is a varying vertical distance D9 from the bottom edge 36*dd* of the vertically oriented rib 36*d*.

In one particular embodiment, the top edge of the discharge pipe 176*d* is a substantially constant vertical distance D29 from the bottom edge 136*ee* of the horizontally oriented bar 136*e*. This is in contrast to the bulk tank trailer 10 where the top edge 76*f* of the discharge pipe 76 is a varying vertical distance D10 from the bottom edge 36*ee* of the horizontally oriented bar 36*e*.

In one particular embodiment, the top edge 158*a* of the at least one straight rear wheel axle 158 is a substantially constant vertical distance D25 from the bottom edge 146*d* of the left rear rail 146. This is in contrast to the bulk tank trailer 10A where the top edge 80*b* of the at least one rear wheel axle 80 is a varying vertical distance from the bottom edge 46*d* of the left rear rail 46.

In one particular embodiment, the top edge 158*a* of the at least one straight rear wheel axle 158 is a substantially constant vertical distance D26 from the horizontal longitudinally extending central plane CP4. This is in contrast to the bulk tank trailer 10A where the top edge 80*b* of the at least one rear wheel axle 80 is a varying vertical distance from the horizontal longitudinally extending central plane CP2.

In one particular embodiment, the top edge 158*a* of the at least one straight rear wheel axle 158 is a substantially constant vertical distance D28 from the bottom edge 136*dd* of the vertically oriented rib 136*d*. This is in contrast to the bulk tank trailer 10A where the top edge 80*b* of the at least one rear wheel axle 80 is a varying vertical distance from the bottom edge 36*dd* of the vertically oriented rib 36*d*.

In one particular embodiment, the top edge 158*a* of the at least one straight rear wheel axle 158 is a substantially constant vertical distance D30 from the bottom edge 136*ee* of the horizontally oriented bar 136*e*. This is in contrast to the bulk tank trailer 10A where the top edge 80*b* of the at least one rear wheel axle 80 is a varying vertical distance from the bottom edge 36*ee* of the horizontally oriented bar 36*e*.

In operation, the discharge of materials bulk tank trailer 100 operates in a similar manner to PRIOR ART bulk tank trailers 10 and 10A; however, the discharge pipe 176*c* is generally straight and free of any bent portions and the rear axles 158 are generally straight free of any humped or bent portions. The bulk material is discharged through the straight discharge pipe 176*c*. As stated above, one of the issues with PRIOR ART tank trailers such as bulk tank trailer 10 is that the bent portion 76d of the discharge pipe often wears out. As the materials are being discharged, the materials contact the bent portion 76d of the discharge pipe 76 which frictionally abrades the bent portion 76d of discharge pipe 76. Also as stated above, one of the issues with PRIOR ART tank trailers such as bulk tank trailer 10A is that the discharge pipe 82 is low to the ground and the humped or bent axle 80 is heavy and expensive. The bulk tank trailer 100 of the present disclosure solves at least these problems.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

A method of discharging particulate materials may be provided in accordance with one aspect of the present disclosure. The method may include filling the interior storage compartment 134 on the bulk tank trailer 100 with the particulate materials (not shown), positioning the straight discharge pipe 176 above the straight rear wheel axle 158 on the bulk tank trailer 100, moving the particulate materials from the interior storage compartment 134 along the straight discharge pipe 176, and discharging the particulate materials from the discharge pipe 176. The discharge pipe 176 may be straight. The method may further include positioning the discharge pipe 176 along a vertical longitudinally extending central plane CP3 of the bulk tank trailer 100. The tank assembly 114 may include a rear frame 144 having at least one frame member 150 defining an opening 150a and the method may further include passing the discharge pipe 176 through the opening 150a.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

Additionally, any method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A bulk tank trailer comprising:
   a tank assembly including a first end and a second end defining a longitudinal direction therebetween and an outer surface and an inner surface defining an interior storage compartment;
   at least one straight rear wheel axle supporting a plurality of ground-engaging wheels; and
   a longitudinally aligned straight discharge pipe in operative communication with the interior storage compartment; wherein the entire straight discharge pipe extends substantially along the length of the tank and is positioned above a horizontal transverse plane of the at least one straight rear wheel axle.

2. The bulk tank trailer of claim 1, further comprising:
   a vertical longitudinally extending central plane; wherein the discharge pipe is longitudinally aligned along the vertical longitudinally extending central plane.

3. The bulk tank trailer of claim 1, further comprising:
   a rear frame of the tank assembly operatively connected to the discharge pipe; wherein the rear frame carries the tank assembly at a first height allowing the discharge pipe to be positioned entirely above the transverse plane.

4. The bulk tank trailer of claim 3, wherein the rear frame further comprises:
   a left rear rail;
   a right rear rail;
   at least one intermediate support member; and
   at least one rear support plate; wherein the left rear rail, the right rear rail, the at least one intermediate support member and the at least one rear support plate carry the tank assembly at the first height.

5. The bulk tank trailer of claim 4, further comprising:
   a top edge of the discharge pipe extending substantially along a length of the discharge pipe;
   a bottom edge of the left rear rail extending substantially along a length of the left rear rail;

a top edge of the at least one straight rear wheel axle extending substantially along a length of the at least one straight rear wheel axle;

a horizontal longitudinally extending central plane of the tank assembly;

a substantially constant first vertical distance between the top edge of the discharge pipe and the bottom edge of the left rear rail;

a substantially constant second vertical distance between the top edge of the discharge pipe and the horizontal longitudinally extending central plane;

a substantially constant third vertical distance between the top edge of the at least one straight rear wheel axle and the bottom edge of the left rear rail; and a substantially constant fourth vertical distance between the top edge of the at least one straight rear wheel axle and the horizontal longitudinally extending central plane.

6. The bulk tank trailer of claim 5, further comprising:
a bottom edge of the at least one rear support plate; wherein the discharge pipe is positioned approximately midway between the bottom edge of the at least one rear support plate and the top edge of the at least one straight rear wheel axle.

7. The bulk tank trailer of claim 5, further comprising:
an air piping system operatively connected to the interior storage compartment and the discharge pipe; wherein the entire air piping system is positioned above the top edge of the at least one straight rear wheel axle and the transverse plane.

8. The bulk tank trailer of claim 5, further comprising:
a valve assembly operatively connected with the interior storage compartment and the discharge pipe; wherein the entire valve assembly is positioned above the top edge of the at least one straight rear wheel axle and the transverse plane.

9. The bulk tank trailer of claim 5, further comprising:
a strengthening assembly including a horizontally oriented bar positioned on the tank assembly; wherein the horizontally oriented bar includes a bottom edge extending substantially along a length of the horizontally oriented bar;

a substantially constant fifth vertical distance between the top edge of the discharge pipe and the bottom edge of the horizontally oriented bar; and a substantially constant sixth vertical distance between the top edge of the at least one straight rear wheel axle and the bottom edge of the horizontally oriented bar.

10. The bulk tank trailer of claim 5, further comprising:
a strengthening assembly including at least one vertically oriented rib positioned on the tank assembly; wherein the at least one rib includes a bottom edge extending substantially along a width of the at least one vertically oriented rib;

a substantially constant fifth vertical distance between the top edge of the discharge pipe and the bottom edge of the vertically oriented rib; and a substantially constant sixth vertical distance between the top edge of the at least one straight rear wheel axle and the bottom edge of the vertically oriented rib.

11. The bulk tank trailer of claim 5, wherein the tank assembly further comprises at least one hopper; wherein the at least one hopper includes a bottom end; wherein an interior of the at least one hopper forms a part of the storage compartment; and wherein the bottom end of the hopper is positioned entirely above the top edge of the discharge pipe and the top edge of the at least one straight rear wheel axle.

12. The bulk tank trailer of claim 11, wherein the at least one hopper includes a first hopper and a second hopper; and wherein the first hopper includes a first bottom end and the second hopper includes a second bottom end; and wherein a first interior of the first hopper and a second interior of the second hopper form a part of the storage compartment; and wherein the first bottom and the second bottom end are positioned entirely above the top edge of the discharge pipe and the top edge of the at least one straight rear wheel axle.

13. The bulk tank trailer of claim 1, wherein the at least one straight rear wheel axle includes a first straight rear wheel axle and a second straight rear wheel axle; and wherein the entire discharge pipe is positioned above a first transverse plane of the first straight rear wheel axle and a second transverse plane of the second straight rear wheel axle.

* * * * *